(12) United States Patent
Yokote

(10) Patent No.: US 7,710,716 B2
(45) Date of Patent: *May 4, 2010

(54) ELECTRONIC APPARATUS

(75) Inventor: Satoshi Yokote, Oume (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/205,666

(22) Filed: Sep. 5, 2008

(65) Prior Publication Data

US 2008/0316688 A1    Dec. 25, 2008

Related U.S. Application Data

(63) Continuation of application No. 11/488,287, filed on Jul. 17, 2006, now Pat. No. 7,428,140.

(30) Foreign Application Priority Data

Jul. 21, 2005   (JP)   ............................. 2005-211465

(51) Int. Cl.
*H05K 5/00*   (2006.01)
(52) U.S. Cl. ............................. 361/679.08; 361/679.09; 361/752
(58) Field of Classification Search ............ 361/679.08, 361/679.09, 752; 400/472; 345/168; 341/22
See application file for complete search history.

(56) References Cited

U.S. PATENT DOCUMENTS

| 4,864,523 | A | * | 9/1989 | Sasaki | ................... 361/679.09 |
| 5,180,237 | A | * | 1/1993 | Chen | ........................... 400/479 |
| 5,421,659 | A | * | 6/1995 | Liang | ........................... 400/472 |
| 5,810,491 | A | * | 9/1998 | Muller et al. | ................ 400/472 |
| 5,920,310 | A | | 7/1999 | Faggin et al. | |
| 6,172,620 | B1 | | 1/2001 | Brick et al. | |
| 6,443,644 | B1 | * | 9/2002 | Takeda et al. | ................ 400/490 |
| 6,724,637 | B2 | | 4/2004 | Li et al. | |

FOREIGN PATENT DOCUMENTS

JP    2003-122454    4/2003

OTHER PUBLICATIONS

United States Office Action dated Oct. 14, 2007 for U.S. Appl. No. 11/488,287, filed Jul. 17, 2006 entitled Electronic Apparatus.

* cited by examiner

*Primary Examiner*—Jayprakash N Gandhi
*Assistant Examiner*—Ingrid Wright
(74) *Attorney, Agent, or Firm*—Blakely, Sokoloff, Taylor & Zafman LLP

(57) ABSTRACT

According to one embodiment, an electronic apparatus includes: a case having an upper wall and a lower wall; a connector housed in the case; a duct portion having a first opening that opens in the upper wall, the duct portion protruding from a peripheral edge of the first opening and more than a lower end of the connector toward the lower wall, the duct portion having a second opening that opens in the case at a protruding end; and a cable passed through the duct portion and electrically connected to the connector.

18 Claims, 9 Drawing Sheets

ELECTRONIC APPARATUS

CROSS-REFERENCE TO RELATED APPLICATIONS

This application is a continuation of application Ser. No. 11/488,287, filed Jul. 17, 2006, now U.S. Pat. No. 7,428,140. 2005-211465, filed Jul. 21, 2005, the entire contents of which are incorporated herein by reference.

BACKGROUND

1. Field

One embodiment of the present invention relates to an electronic apparatus having an input mechanism such as a keyboard, and more particularly to a drip-proof structure of a case to which such an input mechanism is attached.

2. Description of the Related Art

An electronic apparatus such as a portable computer includes a case. In the case, a circuit board on which electronic components such as a connector are mounted is housed. Furthermore, the case includes an upper wall having a keyboard placing portion. The keyboard placing portion has an opening which opens so as to expose the circuit board.

On the other hand, the keyboard which is to be mounted on the keyboard placing portion has a cable which is to be electrically connected to the connector. The work of connecting the cable to the connector is conducted through the opening. After the cable is conducted to the connector, the keyboard is attached to the keyboard placing portion so as to cover the opening.

In the case where the user erroneously spills a liquid such as coffee or drinking water on the keyboard during a period when the keyboard is operated, for example, there is the possibility that the liquid enters the interior of the case via a gap between the keyboard and the keyboard placing portion, and the opening. When the liquid adheres to the circuit board in the case, particularly, there is the possibility that a short circuit between wirings occurs, and an electronic component mounted on the circuit board is damaged. Therefore, a computer which is provided with a water-proof mechanism has been proposed (for example, see JP-A-2003-122454).

The computer disclosed in JP-A-2003-122454 has a first discharge hole which is formed in a board of a keyboard. A guide channel having a second discharge hole is disposed below the first discharge hole. Furthermore, a third discharge hole which opens to the exterior of the computer is disposed below the second discharge hole.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described below in detail with reference to the drawings. In general, according to one embodiment of the invention, an electronic apparatus includes: a case having an upper wall and a lower wall; a connector housed in the case; a duct portion having a first opening that opens in the upper wall, the duct portion protruding from a peripheral edge of the first opening and more than a lower end of the connector toward the lower wall, the duct portion having a second opening that opens in the case at a protruding end; and a cable passed through the duct portion and electrically connected to the connector.

Figure 1:
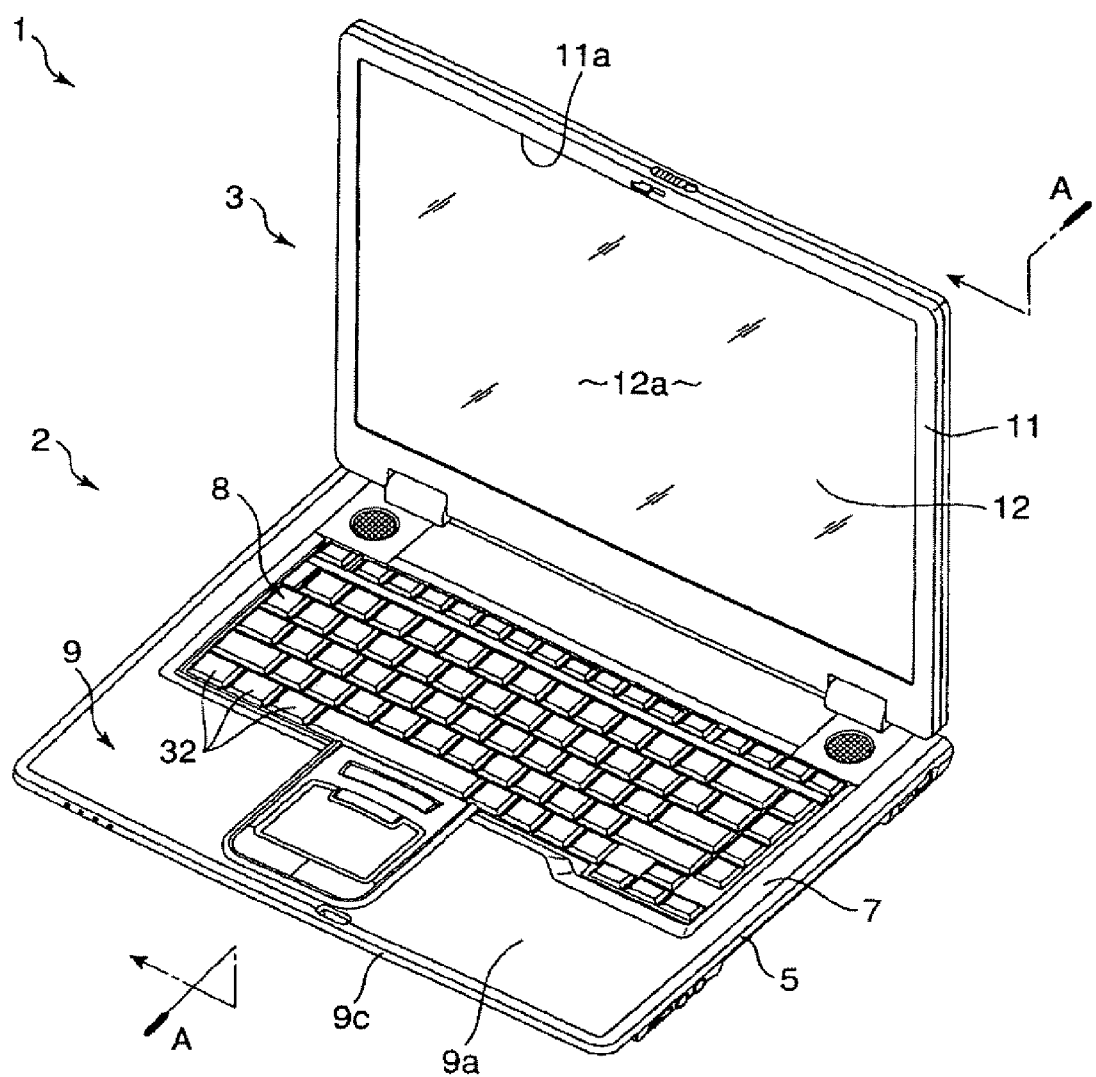
FIG. 1 is an exemplary perspective view of a portable computer according to a first embodiment of the invention.

FIGS. 1 to 7 show a portable computer 1 which is an electronic apparatus of a first embodiment of the invention. As shown in FIG. 1, the portable computer 1 includes a body 2 and a display unit 3.

Figure 2:
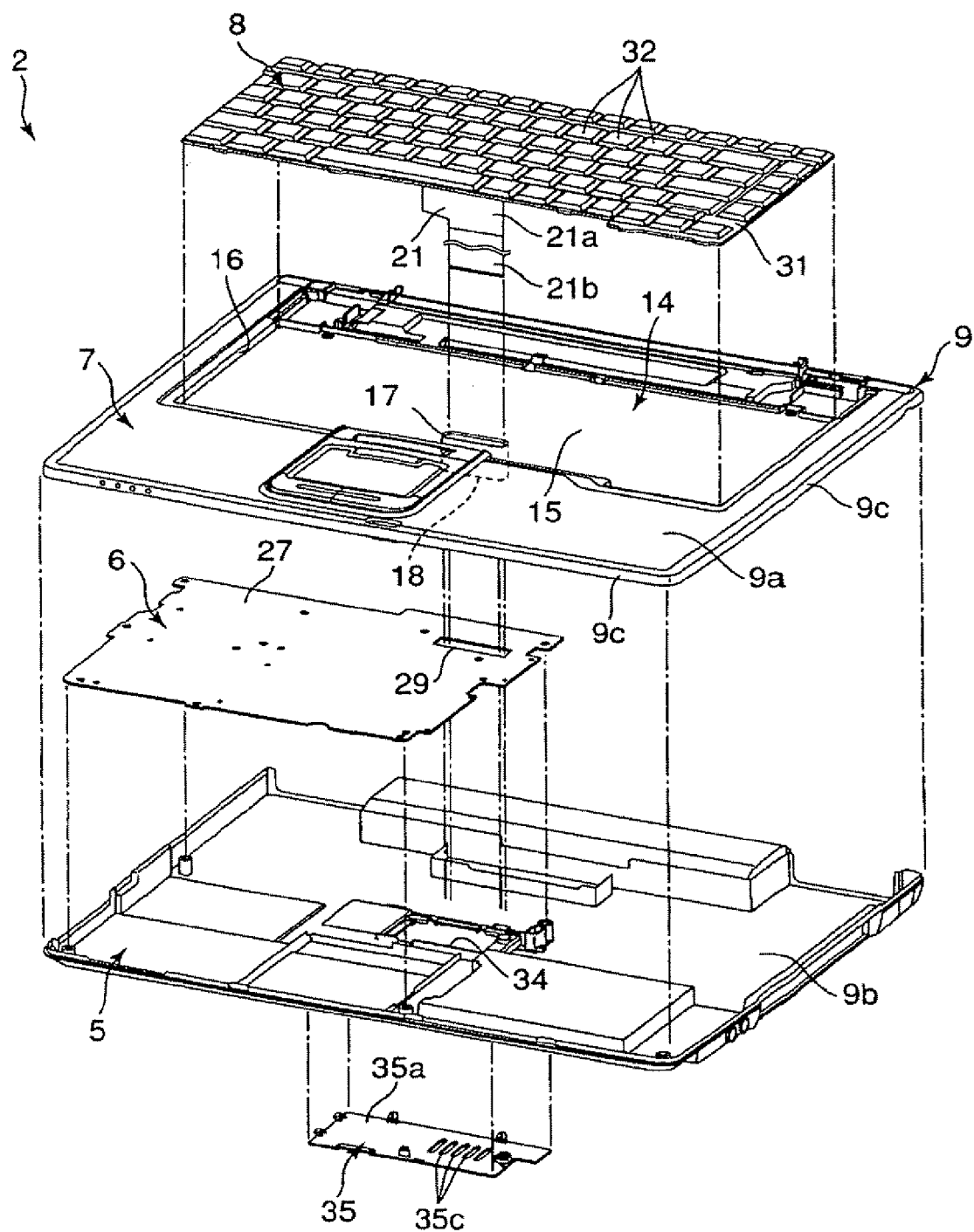
FIG. 2 is an exemplary exploded perspective view of a body in FIG. 1.

As shown in FIG. 2, the body 2 includes a body base 5, a board 6, a body cover 7, and a keyboard 8 serving as an input mechanism. The body cover 7 is attached to the body base 5 from the upper side so as to sandwich the board 6 between the cover and the body base 5. Therefore, the body 2 has a box-like case 9 having an upper wall 9a, a lower wall 9b, and side walls 9c.

As shown in FIG. 1, the display unit 3 includes a display housing 11, and a liquid crystal display panel 12 which is housed in the display housing 11. The liquid crystal display panel 12 has a display screen 12a. The display screen 12a is exposed to the outside of the display housing 11 through a front opening 11a of the display housing 11.

The display unit 3 is supported by a rear end portion of the case 9 via a hinge device which is not shown. Therefore, the display unit 3 is rotatable between a close position where the unit is tilted down so as to cover the upper wall 9a from the upper side, and an open position where the unit is raised so as to expose the display screen 12a.

Figure 3:
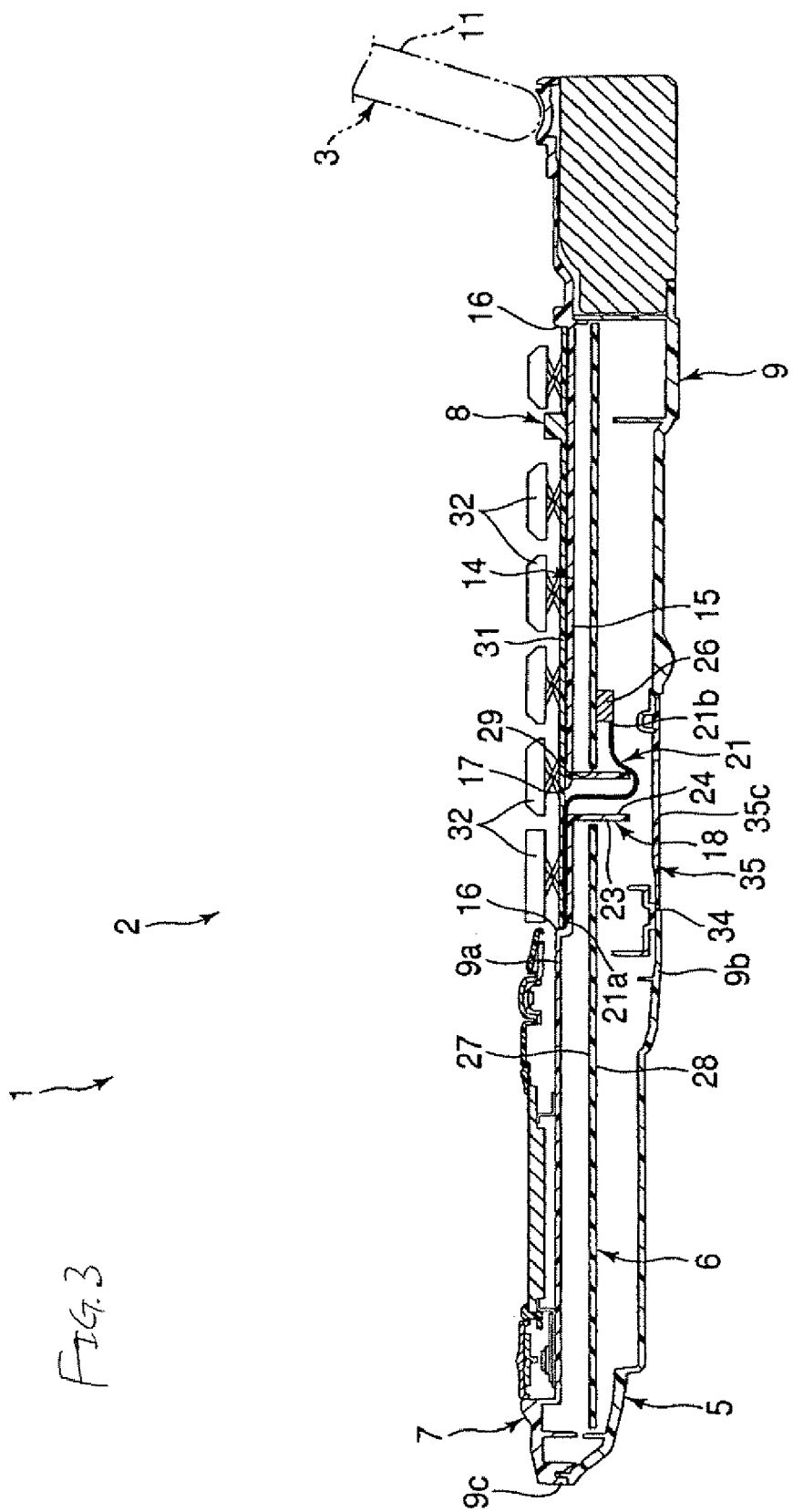
FIG. 3 is an exemplary section view of the portable computer taken along the line A-A in FIG. 1.

As shown in FIG. 2, the upper wall 9a of the body 2 has a keyboard placing portion 14. The keyboard placing portion 14 detachably supports the keyboard 8. The keyboard placing portion 14 has a recess which is slightly larger than the outline of the keyboard 8. As shown in FIG. 3, the keyboard placing portion 14 has a bottom wall 15 serving as a support wall, a peripheral wall 16, and a duct portion 18.

The bottom wall 15 is disposed in a substantially whole area of the keyboard placing portion 14. When the keyboard 8 is attached to the keyboard placing portion 14, the bottom wall 15 supports the keyboard 8 from the lower side. The peripheral wall 16 is raised from the whole peripheral edge of the bottom wall 15. As a part of the upper wall 9a of the case 9, the bottom wall 15 and the peripheral wall 16 are formed integrally with the upper wall 9a in the portion which is outside the keyboard placing portion 14.

Figure 4:
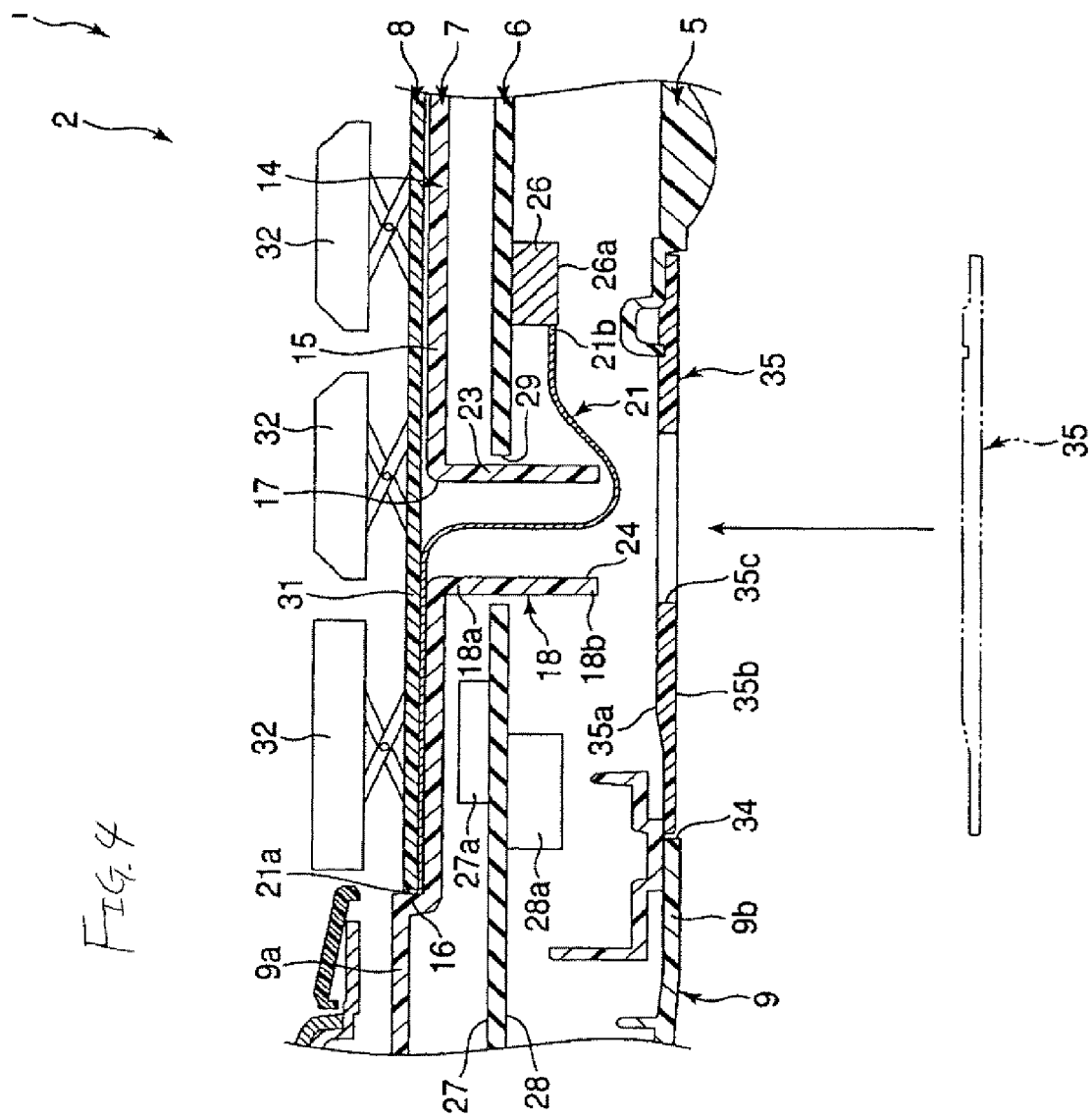
FIG. 4 is an exemplary enlarged section view showing a duct portion in FIG. 3.

As shown in FIG. 4, the duct portion 18 has a first opening 17, a duct wall 23, and a second opening 24.

As shown in FIG. 2, the first opening 17 is formed in the bottom wall 15, and opens inside the case 9. The first opening 17 has a rectangular shape which is rounded at the edges, and in which the longitudinal direction elongates along the width direction of the case 9. Other than the first opening 17, the keyboard placing portion 14 does not have an opening which opens in the case 9, and is watertightly formed together with the upper wall 9*a* in the portion which is outside the keyboard placing portion 14.

The duct wall 23 protrudes from the peripheral edge of the first opening 17 in the bottom wall 15, toward the lower wall 9*b* of the case 9, and extends in a cylindrical manner. Namely, the interior of the duct portion 18 is hollowed, and one end 18*a* of the portion opens in the exterior of the case 9 via the first opening 17. In the other end 18*b* of the duct portion 18, i.e., a lower end portion which is a protruding end, the second H opening 24 downward opens. That is, the second opening 24 opens inside the case 9. The duct portion 18 is formed integrally with the bottom wall 15.

The shape of the duct portion 18 is not restricted to that in the first embodiment, but can be arbitrarily set. The duct portion 18 is not required to be formed integrally with the bottom wall 15, but may be formed separately from the bottom wall 15. In this case, the duct portion 18 is attached to the bottom wall 15 by means of, for example, adhesion or fitting. The configuration in which "the duct portion 18 protrudes toward the lower wall 9*b*" is not restricted to that in which the duct portion 18 protrudes in a direction perpendicular to the lower wall 9*b*, but the protrusion may be conducted in any direction as far as the duct portion 18 protrudes in such a manner that it approaches the lower wall 9*b*. "The protruding end of the duct portion 18" is not restricted to the protruding tip end in a narrow meaning, but includes also a portion in the vicinity of the protruding tip end. The opening direction of the second opening 24 is not restricted to a downward direction. For example, the direction may be an obliquely downward direction, or a horizontal direction.

As shown in FIG. 4, the case 9 houses the board 6 and a connector 26. The board 6 is positioned between the second opening 24 of the duct portion 18 and the bottom wall 15 of the keyboard placing portion 14. In other words, the duct portion 18 is formed so as to protrude to the vicinity of the lower wall 9*b* more than the board 6.

Figure 7:
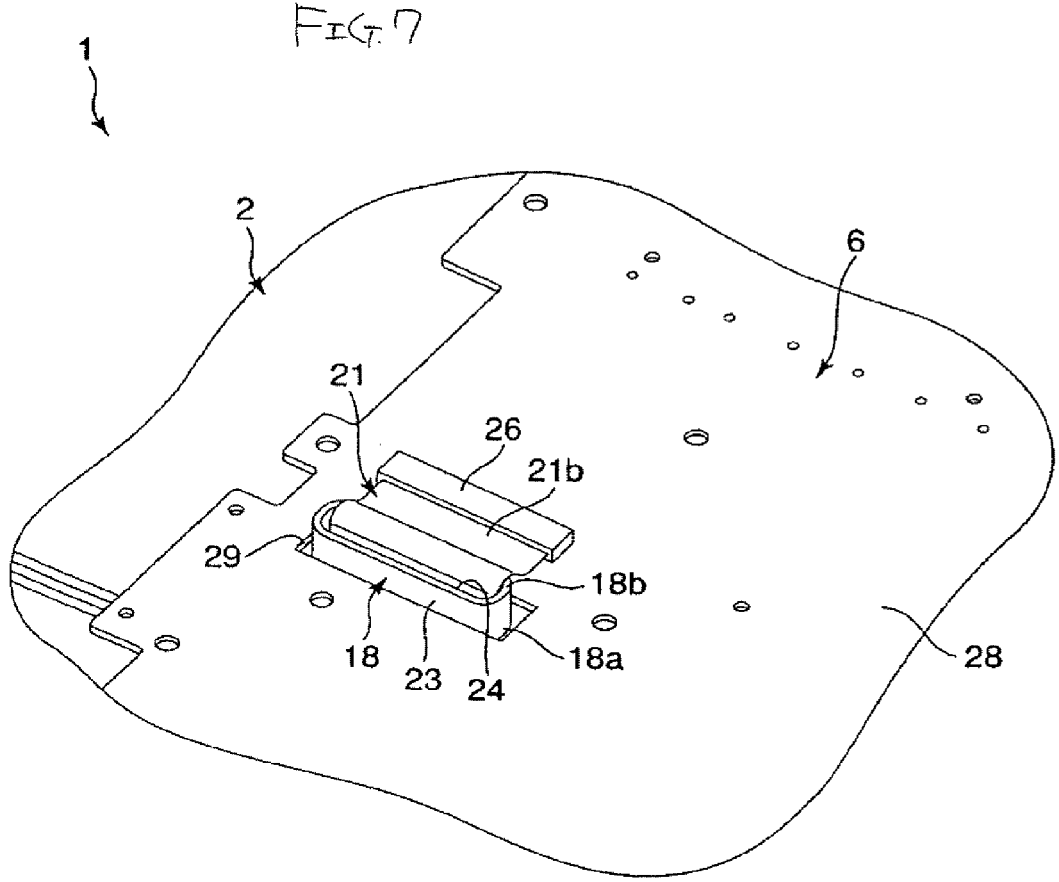
FIG. 7 is an exemplary enlarged perspective view showing the periphery of a connector in FIG. 6.

The board 6 has a first face 27, a second face 28, and a through hole 29. The through hole 29 is formed in a portion which, when the board 6 is housed in the case 9, corresponds to the duct portion 18. As shown in FIG. 7, the through hole 29 is a rectangular hole which is slightly larger than the outer periphery of the duct wall 23. When the body cover 7 is attached to the body base 5, the duct portion 18 is passed through the through hole 29, whereby the board 6 is placed between the second opening 24 of the duct portion 18 and the bottom wall 15.

As shown in FIG. 4, the first face 27 of the board 6 is a face opposing the bottom wall 15 of the keyboard placing portion 14, i.e., the upper face. The second face 28 is a face opposing the lower wall 9*b* of the case 9, i.e., the lower case. Electronic components 27*a* which are lower in mounting height than electronic components 28*a* mounted on the second face 28 are mainly mounted on the first face 27.

The connector 26 is mounted on the second face 28 of the board 6. Therefore, the duct portion 18 protrudes toward the lower wall 9*b* more than the lower end 26*a* of the D connector 26, that is, downward protrudes more than the lower end 26*a* of the connector 26. The board 6 and the connector 26 are positioned within the range of the protrusion height of the duct portion 18.

As shown in FIG. 4, the keyboard 8 has a keyboard board 31, plural keys 32, and a cable 21. The keyboard board 31 is placed on the bottom wall 15 of the keyboard placing portion 14. The keys 32 are arranged on the upper face of the keyboard board 31.

The cable 21 is guided from the keyboard board 31 to the duct portion 18. The cable 21 is covered by an insulator. One end 21*a* of the cable 21 is connected to the keyboard board 31 in the keyboard placing portion 14. The other end 21*b* of the cable 21 is folded back so as to be directed toward the second face 28 of the board 6, after passing through the duct portion 18, and then connected to the connector 26. Namely, the cable 21 electrically connects the keyboard 8 to the connector 26. Therefore, the cable 21 transmits a signal which is inputted to the keyboard board 31 by depressing one of the keys 32, to the board 6 to which the connector 26 is connected.

Figure 6:
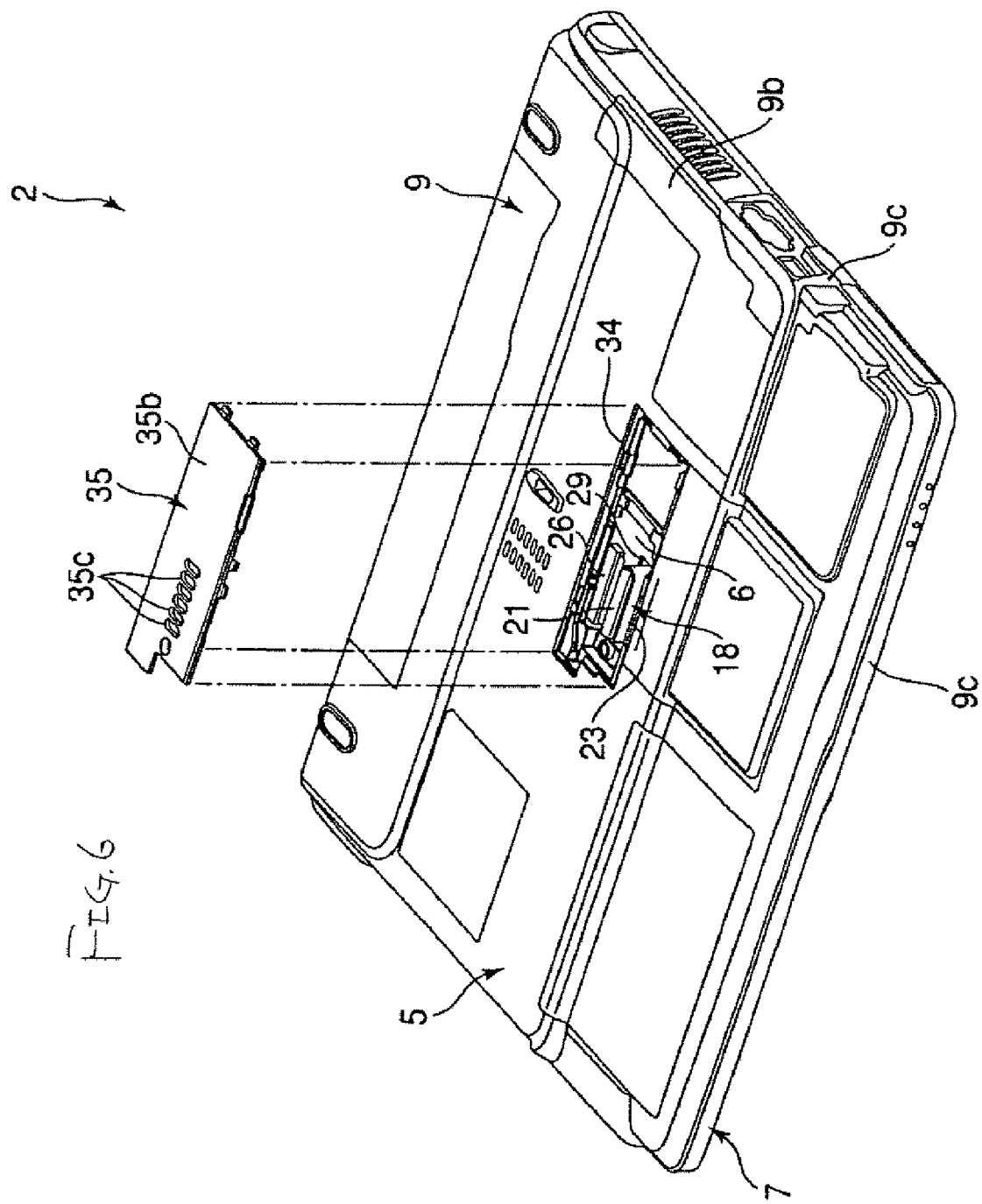
FIG. 6 is an exemplary perspective view of the body in FIG. 1 viewed from the rear.

As shown in FIG. 6, the lower wall 9*b* of the case 9 has an opening 34 which opens so as to oppose the connector 26. The duct portion 18 and the connector 26 are exposed to the exterior of the case 9 via the opening 34. A work of attaching the cable 21 to the connector 26 is conducted through the opening 34. The lower wall 9*b* has a lid 35 serving as a cover. The lid 35 is detachably attached to the lower wall 9*b* so as to cover the opening 34.

As shown in FIG. 4, the lid 35 has: an upper face 35*a* which is exposed to the interior of the case 9; a lower face 35*b* which is exposed to the exterior of the case 9; and plural discharge holes 35*c* which are passed through from the upper face 35*a* to the lower face 35*b*. The discharge holes 35*c* are formed in a portion corresponding to the second opening 24 of the duct portion 18, i.e., a portion below the second opening 24.

Next, the function of the portable computer 1 will be described.

Figure 5:
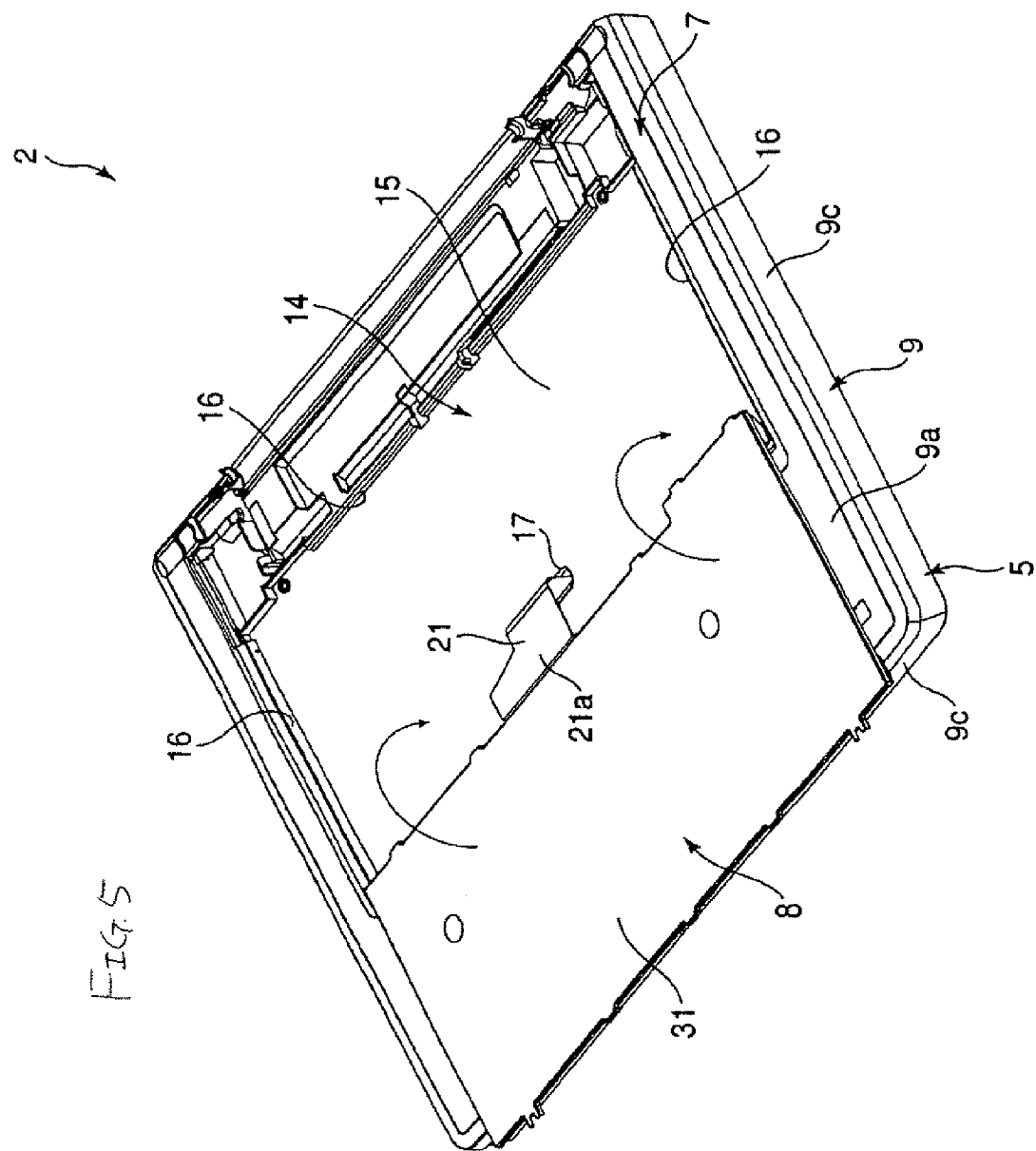
FIG. 5 is an exemplary perspective view showing the manner of attaching a keyboard to the body in FIG. 1.

First, the procedure of attaching the keyboard 8 to the body 2 will be described. After the body base 5 and the body cover 7 are assembled, the keyboard 8 is attached to the body 2. Specifically, as shown in FIG. 5, the keyboard 8 is placed upside down on the upper wall 9*a* of the body 2, and the cable 21 is inserted into the interior of the duct portion 18 via the first opening 17. Next, the keyboard 8 is reversed to be returned to the normal posture, and then attached to the keyboard placing portion 14.

Thereafter, as shown in FIG. 6, the portable computer 1 is placed upside down. In this state, as shown in FIG. 7, works of leading out the end 21*b* of the cable 21 from the second opening 24 of the duct portion 18 via the opening 34 of the lower wall 9*b*, and connecting the cable 21 to the connector 26 are conducted. Finally, the lid 35 which covers the opening 34 is attached to the lower wall 9*b*, and the portable computer 1 is returned to the normal vertical posture.

In the case where the user erroneously spills a liquid such as coffee or drinking water on the keyboard 8 during a period when the portable computer 1 is used, the liquid passes through the gap between the keyboard 8 and the keyboard placing portion 14, and the first opening 17, and then is guided to the interior of the duct portion 18. The liquid which has been guided to the interior of the duct portion 18 freely falls along the duct wall 23 to a position in the vicinity of the lower wall 9*b* more than the board 6 and the connector 26. The liquid is discharged to the exterior of the case 9 via the discharge holes 35*c*.

According to thus configured portable computer 1, the water resistance of the portable computer 1 can be easily enhanced without complicating the structure of the case 9. Namely, the liquid which tries to intrude into the body 2 enters the interior of the case 9 via the second opening 24 with passing through the duct portion 18. The second opening 24 is positioned in the vicinity of the lower wall 9*b* more than the board 6 and the connector 26, namely, lower than the board 6 and the connector 26. Consequently, there is no possibility that the liquid discharged from the second opening 24 falls on the board 6 and the connector 26. In this way, the board 6 and the connector 26 are protected from a liquid spilled onto the keyboard 8, whereby the portable computer 1 in which the water resistance is improved can be obtained.

Particularly, the portable computer 1 does not require an expensive sealing member of sponge, rubber, or the like. Furthermore, it is not necessary to additionally dispose a water-proof member such as an attachment member for attaching the sealing member. Namely, the portable computer 1 can be produced very economically.

In a structure which uses a sealing member, the sealing member is usually attached with being compressed, and hence the strengths and thicknesses of the body base 5 and the body cover 7 must be considered. In the portable computer 1 of the embodiment, however, such consideration is not necessary. Furthermore, a member such as that for compressing the sealing member is not required to be attached to the keyboard placing portion 14. In the portable computer 1, therefore, the thickness of the body 2 can be reduced.

In the portable computer 1 of the embodiment, the keyboard placing portion 14 other than the first opening 17 is watertightly formed together with the upper wall 9a. Unlike a keyboard placing portion of a conventional portable computer, namely, an opening for a connecting work through which the interior of the case 9 is largely exposed is not disposed. According to the configuration, the board 6 and the connector 26 are further protected from a liquid spilled onto the keyboard 8.

In the portable computer 1, even when an opening for a connecting work is not disposed in the keyboard placing portion 14, the work of connecting the cable 21 to the connector 26 is enabled by disposing the opening 34 in the lower wall 9b of the case 9.

Since the duct portion 18 is formed integrally with the bottom wall 15 of the keyboard placing portion 14, a gap which may be formed as a result of attachment of the duct portion 18 and the bottom wall 15 can be eliminated, and it is possible to prevent a liquid from entering through the gap. The discharge holes 35c allows a liquid which has passed through the duct portion 18 to be discharged to the outside of the case 9 without remaining in the case 9.

Since the board 6 has the through hole 29, the board 6 can be placed in more proximity to the bottom wall 15 as compared with the second opening 24 of the duct portion 18, without being hindered by the duct portion 18. In other words, the duct portion 18 can protrude toward the lower wall 9b without being hindered by the board 6. Since the electronic components 27a which are lower in mounting height than the electronic components 28a mounted on the second face 28 are mounted on the first face 27 of the board 6, the distance between the board 6 and the bottom wall 15 can be reduced. Therefore, the protrusion height of the duct portion 18 can be suppressed, and the body 2 can be thinned.

Next, a portable computer 1a which is an electronic apparatus according to a second embodiment of the invention will be described with reference to FIG. 8. The components having the identical functions as those of the portable computer 1 of the first embodiment are denoted by the same reference numerals, and their description is omitted.

A board 6a which is housed in the body 2 of the portable computer 1a is placed between the second opening 24 of the duct portion 18 and the bottom wall 15 of the keyboard placing portion 14. The board 6a has a cutaway portion 41. The cutaway portion 41 is disposed in a portion which, when the board 6 is attached in the case 9, corresponds to the duct portion 18. In order to avoid the duct portion 18, the cutaway portion 41 is cut away to be slightly larger than the outer periphery of the duct wall 23.

Figure 8:
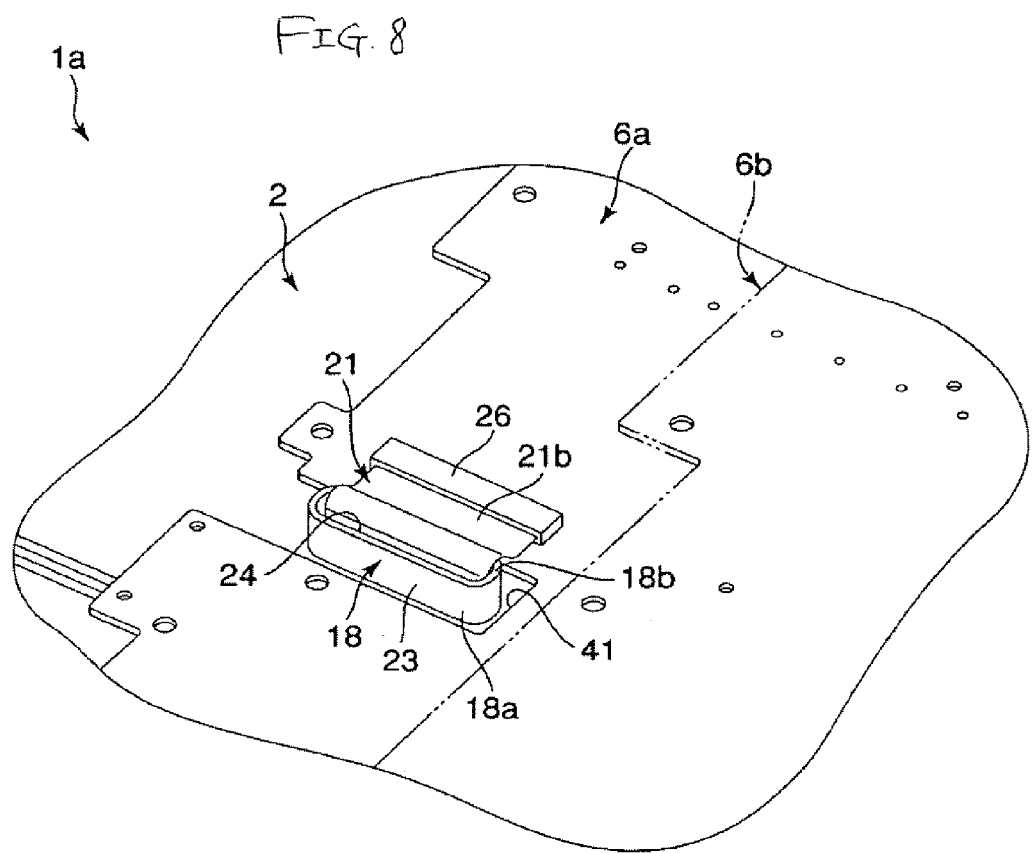
FIG. 8 is an exemplary perspective view showing the periphery of a connector of a portable computer according to a second embodiment of the invention.

As shown in FIG. 8, when the body cover 7 is attached to the body base 5, the board 6a is placed so as to avoid the duct portion 1S, because the board 6a has the cutaway portion 41. Therefore, the board 6a is placed between the second opening 24 of the duct portion 18 and the bottom wall 15, without being hindered by the duct portion 18.

Also in the thus configured portable computer 1a, the board 6a can be placed between the second opening 24 and the bottom wall 15. Therefore, the water resistance of the portable computer 1a can be easily enhanced without complicating the structure. As indicated by the two-dot chain line in FIG. 8, a board 6b itself may be placed at a position where it is not in contact with the duct portion 18, without disposing the through hole 29 and the cutaway portion 41.

Figure 9:
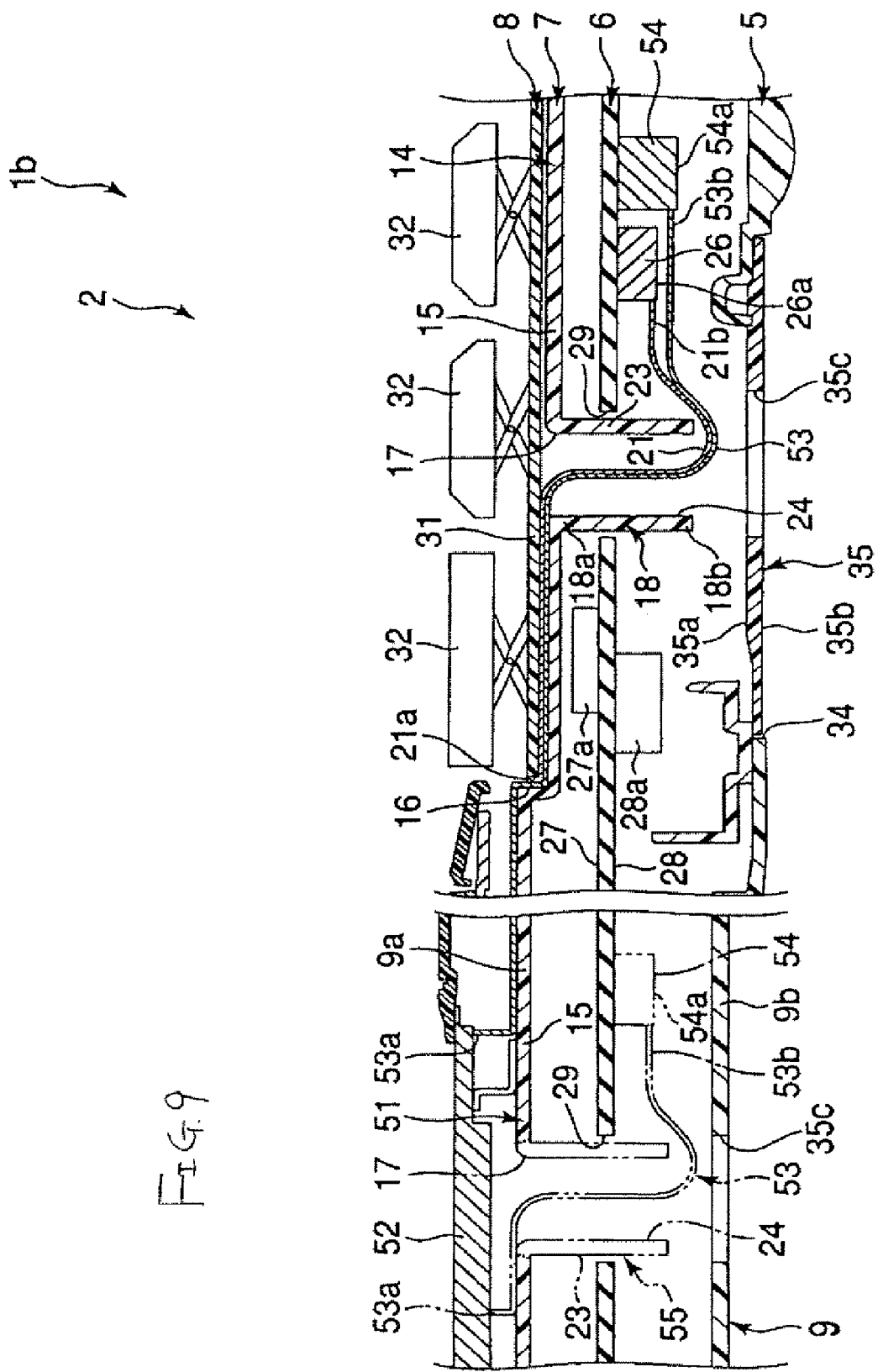
FIG. 9 is an exemplary section view of a portable computer according to a third embodiment of the invention.

Next, a portable computer 1b which is an electronic apparatus according to a third embodiment of the invention will be described with reference to FIG. 9. The components having the identical functions as those of the portable computer 1 of the first embodiment are denoted by the same reference numerals, and their description is omitted.

A touch pad placing portion 51 is formed on the upper wall 9a of the portable computer 1b. A touch pad 52 serving as an input mechanism is attached to the touch pad placing portion 51. The touch pad 52 has a cable 53. As shown in FIG. 9, the cable 53 is led out to the keyboard placing portion 14, and passed through the duct portion 18. One end 53a of the cable 53 is connected to the touch pad 52 in the touch pad placing portion 51. The other end 53b of the cable 53 is connected to a connector 54 for the touch pad 52 inside the case 9. Namely, the cable 53 electrically connects the touch pad 52 to the connector 54. The connector 54 is placed between the second opening 24 of the duct portion 18 and the bottom wall 15. The duct portion 18 protrudes downward more than the lower ends 54a of the connector 54.

According to thus configured portable computer 1b, the water resistance of the portable computer 1b can be easily enhanced without complicating the structure. In addition to the connector 26 to which the keyboard 8 is connected, the connector 54 to which the touch pad 52 is connected, and the board 6 can be enhanced in waterproofness. The cable 53 of the touch pad 52 may be placed with being vertically juxtaposed with the cable 21 of the keyboard 8 as in the embodiment, or may be placed with being horizontally juxtaposed with the cable 21 of the keyboard 8. As indicated by the two-dot chain line in FIG. 9, a duct portion 55 for the touch pad 52 may be disposed in the touch pad placing portion 51. The duct portion 55 has a first opening 17 which opens in the touch pad placing portion 51, and a second opening 24 which opens in the case 9. The cable 53 of the touch pad 52 is passed through the duct portion 55, and then electrically connected to the connector 54 in the case 9.

The portable computers 1, 1a, 1b of the first to third embodiments have been described. It is a matter of course that the invention is not restricted to them. For example, the cables which are passed through the duct portion 18 are not restricted to the cable 21 for the keyboard 8 and the cable 53 for the touch pad 52. For example, the invention can be applied also to a cable which electrically connects the liquid crystal display panel 12 of the display unit 3 to the board 6 housed in the case 9. Furthermore, the invention can be applied to any electronic apparatus having a cable which is disposed outside the case 9, and which is connected to the connector 26 or the board 6 housed in the case 9.

The place where the duct portion 18 is disposed is not restricted to the keyboard placing portion 14 or the touch pad placing portion 51. For example, the duct portion 18 may be disposed in the upper wall 9a between the display unit 3 and the keyboard placing portion 14, and may be disposed in any place.

While certain embodiments of the inventions have been described, these embodiments have been presented by way of example only, and are not intended to limit the scope of the inventions. Indeed, the novel structure described herein may be embodied in a variety of other forms; furthermore, various omissions, substitutions and changes in the structure described herein may be made without departing from the spirit of the inventions. The accompanying claims and their equivalents are intended to cover such forms of modifications as would fall within the scope and spirit of the inventions.

What is claimed is:

1. An electronic apparatus comprising:
    a case that includes:
        an upper wall in which a first opening is formed, and
        a lower wall;
    a duct portion that protrudes from the first opening formed in the upper wall toward the lower wall to regulate a flowing direction of a liquid spilled on the case, the duct portion having a second opening that opens in the case at a protruding end;
    a board that is housed in the case and that includes a hole formed therein at a portion below the second opening;
    a connector disposed on the board; and
    a cable extending along the upper wall before passing through the duct portion, the cable is electrically connected to the connector.

2. The electronic apparatus according to claim 1,
    wherein the upper wall includes a keyboard placing portion on which a keyboard is disposed, and
    wherein the duct portion is disposed in the keyboard placing portion.

3. The electronic apparatus according to claim 2, wherein the cable electrically connects the keyboard and the connector.

4. The electronic apparatus according to claim 1, wherein the duct portion is integrally formed with the upper wall.

5. The electronic apparatus according to claim 1, wherein the lower wall includes
    an opening that is opposed to the connector; and
    a cover that covers the opening.

6. The electronic apparatus according to claim 1, wherein the lower wall includes a discharge hole that is disposed at a position corresponding to the second opening of the duct portion to discharge the liquid passed through the duct portion to an exterior of the case.

7. The electronic apparatus according to claim 1, wherein the cable is loosely passed through the duct portion so that there is spacing between an inner surface of the duct portion and the cable.

8. The electronic apparatus according to claim 1, wherein the cable passes through the duct portion that is in a substantially vertical orientation.

9. An electronic apparatus comprising:
    a case that includes an upper wall in which a first opening is formed, and a lower wall;
    a duct portion that protrudes from the first opening formed in the upper wall toward the lower wall to regulate a flowing direction of a liquid spilled on the case, the duct portion having a second opening that opens in the case at a protruding end;
    a board that is housed in the case, the board being placed to avoid being directly below the second opening;
    a connector that is disposed on the board; and
    a cable extending along the upper wall of the case before passing through the duct portion, the cable being electrically coupled to the connector.

10. The electronic apparatus according to claim 9 further comprising a keyboard disposed on the upper wall of the case.

11. The electronic apparatus according to claim 10, wherein the cable electrically connects the keyboard and the connector.

12. The electronic apparatus according to claim 9, wherein the duct portion is integrally formed with the upper wall.

13. The electronic apparatus according to claim 9, wherein the lower wall includes an opening that is opposed to the connector.

14. The electronic apparatus according to claim 13, wherein the lower wall further includes a cover that covers the opening.

15. The electronic apparatus according to claim 9, wherein the lower wall includes a discharge hole that is disposed at a position corresponding to the second opening of the duct portion to discharge the liquid passed through the duct portion to an exterior of the case.

16. The electronic apparatus according to claim 9, wherein the cable is loosely passed through the duct portion so that there is spacing between an inner surface of the duct portion and the cable.

17. A method for assembling an electronic apparatus, the method comprising:
    assembling a case including an upper wall and a lower wall to sandwich a board therebetween, the upper wall including a first opening formed therein and a duct portion protruding from the first opening toward the lower wall, the lower wall including an opening formed therein;
    passing a cable coupled to a keyboard alone a spacing between the keyboard and a portion of the upper wall before passing the cable through the duct portion;
    placing the keyboard onto the upper wall;
    coupling the cable with a connector disposed on the board; and
    attaching a cover onto the lower wall to cover the opening.

18. The method according to claim 17, wherein passing of the cable through the duct portion is oriented so that the cable avoids contact with an inner surface of the duct portion.

* * * * *